United States Patent
Sanders et al.

(10) Patent No.: US 10,622,835 B2
(45) Date of Patent: Apr. 14, 2020

(54) DISTRIBUTED ENERGY SYSTEM EDGE UNIT

(71) Applicant: Sunverge Energy, Inc., San Francisco, CA (US)

(72) Inventors: Dean Sanders, Linden, CA (US); Stu Statman, San Francisco, CA (US)

(73) Assignee: Sunverge Energy, Inc., San Francisco, CA (US)

( * ) Notice: Subject to any disclaimer, the term of this patent is extended or adjusted under 35 U.S.C. 154(b) by 0 days.

(21) Appl. No.: 16/125,410

(22) Filed: Sep. 7, 2018

(65) Prior Publication Data

US 2019/0288556 A1 Sep. 19, 2019

Related U.S. Application Data

(63) Continuation of application No. 15/197,459, filed on Jun. 29, 2016, now abandoned, which is a
(Continued)

(51) Int. Cl.
*G05B 15/02* (2006.01)
*G05B 11/01* (2006.01)
(Continued)

(52) U.S. Cl.
CPC .............. *H02J 15/00* (2013.01); *G05B 15/02* (2013.01); *H02J 3/14* (2013.01); *H02J 3/32* (2013.01);
(Continued)

(58) Field of Classification Search
CPC ...... G05B 15/02; H02J 13/0006; H02J 15/00; H02J 3/14; H02J 3/32; H02J 3/381;
(Continued)

(56) References Cited

U.S. PATENT DOCUMENTS

| 8,457,797 | B2 | 6/2013 | Imes et al. |
| 8,682,495 | B2 | 3/2014 | Carralero et al. |

(Continued)

FOREIGN PATENT DOCUMENTS

| WO | WO 2014164976 | 10/2014 |
| WO | WO 2015017201 | 2/2015 |

OTHER PUBLICATIONS

International Search Report for PCT Application No. PCT/US2016/040530 issued by the US Searching Authority dated Sep. 14, 2016, pp. 1-2.

(Continued)

*Primary Examiner* — Abdelmoniem I Elamin
(74) *Attorney, Agent, or Firm* — Haynes and Boone, LLP (57) ABSTRACT

In accordance with aspects of the present invention a distributed energy system edge unit is presented. An edge unit includes a power grid interface; one or more device interfaces; a processing unit coupled to the power grid interface and the one or more device interfaces, the processing unit including a communication state that allows communications with an external entity; a control and monitor state that communicates with the communication state; a check unit state that communicates with the control and monitor state and provides a unit state data; wherein the control and monitor state and the communication state provide an instruction data set, current operating parameters according to the unit state data, the instruction set data, and a characterization parameter data, and wherein the control and monitor state provides control signals to the power grid interface and the one or more device interfaces.

17 Claims, 4 Drawing Sheets

Related U.S. Application Data continuation of application No. 14/791,420, filed on Jul. 4, 2015, now Pat. No. 9,960,637.

(51) Int. Cl.

| | | |
|---|---|---|
| *H02J 13/00* | (2006.01) | |
| *H02J 15/00* | (2006.01) | |
| *H02J 3/14* | (2006.01) | |
| *H02J 3/32* | (2006.01) | |
| *H02J 3/38* | (2006.01) | |
| *H02J 7/35* | (2006.01) | |

(52) U.S. Cl.
CPC .............. *H02J 3/381* (2013.01); *H02J 3/383* (2013.01); *H02J 7/35* (2013.01); *H02J 13/0006* (2013.01); *Y02B 70/3225* (2013.01); *Y02E 10/563* (2013.01); *Y02E 10/566* (2013.01); *Y02E 60/721* (2013.01); *Y02E 70/30* (2013.01); *Y02T 90/168* (2013.01); *Y04S 10/126* (2013.01); *Y04S 20/222* (2013.01); *Y04S 30/12* (2013.01)

(58) Field of Classification Search
CPC ......... H02J 3/383; H02J 7/35; Y02B 70/3225; Y02E 10/563; Y02E 10/566; Y02E 60/721; Y02E 70/30; Y02T 90/168; Y04S 10/126; Y04S 20/222; Y04S 30/12
See application file for complete search history.

(56) References Cited

U.S. PATENT DOCUMENTS

| | | | |
|---|---|---|---|
| 8,855,829 | B2 | 10/2014 | Golden et al. |
| 8,918,225 | B2 | 12/2014 | Lazaris |
| 8,965,590 | B2 | 2/2015 | Boardman et al. |
| 9,094,385 | B2 | 7/2015 | Akyol et al. |
| 9,136,732 | B2 * | 9/2015 | Wolter ..................... H02J 7/35 |
| 9,172,249 | B2 | 10/2015 | Rockenfeller et al. |
| 9,188,109 | B2 | 11/2015 | Lazaris |
| 9,263,894 | B2 | 2/2016 | Robinett et al. |
| 9,529,349 | B2 | 12/2016 | Marti et al. |
| 9,576,472 | B2 | 2/2017 | Koch |
| 9,641,026 | B2 | 5/2017 | Boardman et al. |
| 9,722,813 | B2 | 8/2017 | Benes et al. |
| 9,733,623 | B2 * | 8/2017 | Yang ..................... G05B 13/02 |
| 9,795,048 | B2 | 10/2017 | Simonelli et al. |
| 9,853,488 | B2 | 12/2017 | Fincham et al. |
| 9,881,033 | B2 | 1/2018 | Boardman et al. |
| 2004/0024502 | A1 | 2/2004 | Squires et al. |
| 2004/0030457 | A1 | 2/2004 | Bayoumi et al. |
| 2004/0167677 | A1 | 8/2004 | Weiss |
| 2006/0158037 | A1 | 7/2006 | Danley et al. |
| 2008/0167756 | A1 | 7/2008 | Golden et al. |
| 2009/0088907 | A1 * | 4/2009 | Lewis ..................... G01D 4/002 |
| | | | 700/286 |
| 2009/0276488 | A1 | 11/2009 | Alstad |
| 2010/0017249 | A1 | 1/2010 | Fincham et al. |
| 2011/0046800 | A1 | 2/2011 | Imes et al. |
| 2011/0106321 | A1 | 5/2011 | Cherian et al. |
| 2012/0101639 | A1 | 4/2012 | Carralero et al. |
| 2012/0130556 | A1 | 5/2012 | Marhoefer |
| 2012/0232709 | A1 | 9/2012 | Robinett et al. |
| 2012/0310434 | A1 * | 12/2012 | Taft ..................... H02J 3/00 |
| | | | 700/297 |
| 2012/0310559 | A1 | 12/2012 | Taft |
| 2013/0015703 | A1 | 1/2013 | Rouse et al. |
| 2013/0036311 | A1 | 2/2013 | Aykol et al. |
| 2013/0041516 | A1 | 2/2013 | Rockenfeller et al. |
| 2014/0218209 | A1 | 8/2014 | Koch |
| 2015/0039145 | A1 * | 2/2015 | Yang ..................... G05B 13/02 |
| | | | 700/291 |
| 2015/0105924 | A1 | 4/2015 | Lazaris |
| 2015/0105928 | A1 | 4/2015 | Lazaris |
| 2015/0127180 | A1 | 5/2015 | Oh et al. |
| 2015/0127685 | A1 | 5/2015 | Boardman et al. |
| 2015/0134135 | A1 * | 5/2015 | Wong ..................... H02J 3/38 |
| | | | 700/295 |
| 2015/0254787 | A1 * | 9/2015 | Eger ..................... G06Q 50/06 |
| | | | 700/291 |
| 2015/0318706 | A1 | 11/2015 | Ilinca et al. |
| 2016/0020728 | A1 * | 1/2016 | Wolter ..................... H02J 7/35 |
| | | | 307/66 |
| 2016/0072289 | A1 | 3/2016 | Lazaris |
| 2017/0126012 | A1 * | 5/2017 | Grebel ..................... H02J 3/005 |
| 2017/0160711 | A1 | 6/2017 | Wong et al. |

OTHER PUBLICATIONS

Written Opinion for PCT Application No. PCT/US2016/040530 issued by the US Searching Authority dated Sep. 14, 2016, pp. 1-10.
International Search Report for PCT Application No. PCT/US2016/040540 issued by the US Searching Authority dated Sep. 15, 2016, pp. 1-2.
Written Opinion for PCT Application No. PCT/US2016/040540 issued by the US Searching Authority dated Sep. 15, 2016, pp. 1-4.
International Search Report for PCT Application No. PCT/US2016/040545 issued by the US Searching Authority dated Sep. 26, 2016, pp. 1-2.
Written Opinion for PCT Application No. PCT/US2016/040545 issued by the US Searching Authority dated Sep. 26, 2016, pp. 1-7.
Zadeh, M.R.D.; A. Hajimiragha; M. Adamiak; A. Palizban; and S. Allan, "Design and implementaion of a microgrid controller," In Protective Relay Engineers, 2011 64$^{th}$ Annual Conference, pp. 137-145, IEEE, 2011.
Liu, Hai-xuan, "Studies on the monitoring and control platform of microgrids," In Electricity Distribution (CICED), China International Conference on, pp. 1-5, IEEE, 2012.
Gomis-Bellmnt, Oriol, Andreas Sumper, Alba Colet-Subirachs, Albert Ruiz-Alvarez, Felipe Alvarez-Cuevas-Figuerola, and Antoni-Sudria-Andreu, "A utility connected microgrid based on power emulators," In Power and Energy Society General Meeting, pp. 1-6, IEEE 2011.
Extended European Search Report and Written Opinion issued by the European Searching Authority dated Feb. 25, 2019 for EP Application No. EP 16821841.0. pp. 1-19.
Dimeas et al., "Microgrids Control Issues," In: "Microgrids" Dec. 26, 2013, John Wiley and Sons, Ltd., Chichester, United Kingdom, pp. 25-80.
European Search Report from European Patent Application No. 16821840.2, dated Mar. 22, 2019, pp. 1-11.
European Search Report from European Patent Application No. 16821841.0, dated Feb. 20, 2019, pp. 1-10.
European Search Report from European Patent Application No. 16821842.8, dated Mar. 29, 2019, pp. 1-9.
International Preliminary Report on Patentability from PCT/US2016/040530, dated Jan. 9, 2018, pp. 1-6.
International Preliminary Report on Patentability from PCT/US2016/040540, dated Jan. 9, 2018, pp. 1-5.
International Preliminary Report on Patentability from PCT/US2016/040545, dated Jan. 9, 2018, pp. 1-8.
Marra et al., "Implementation of an Electric Vehicle Test Bed Controlled by a Virtual Power Plant for Contributing to Regulating Power Reserves," 2012 IEEE Power and Energy Society General Meeting, San Diego, CA, Jul. 22-26, 2012, IEEE, Piscataway, NJ, Jul. 22, 2012, pp. 1-7.
Raab et al. "Virtual Power Plant Control Concepts with Electric Vehicles," Intelligent System Application to Power Systems (ISAP), 2011 16th International Conference on, IEEE, Sep. 25, 2011, pp. 1-6.
Zadeh et al. "Design and Implementation of a Microgrid Controller," Protective Relay Engineers, 2011 64th Annual Conference for IEEE, Apr. 11, 2011, pp. 137-145.

* cited by examiner

DISTRIBUTED ENERGY SYSTEM EDGE UNIT

RELATED APPLICATIONS

The present application is a continuation of U.S. patent application Ser. No. 15/197,459, filed Jun. 29, 2016, now abandoned, which is a continuation of U.S. patent application Ser. No. 14/791,420, filed on Jul. 4, 2015, now U.S. Pat. No. 9,960,637, issued on May 1, 2018, entitled "Renewable Energy Integrated Storage and Generation Systems, Apparatus, and Methods with Cloud Distributed Energy Management Services," by Dean Sanders and Stu Statman, each of which is herein incorporated by reference pa its entirety.

TECHNICAL FIELD

Embodiments generally related to systems and methods for Distributed Energy Systems and, in particular, to an individual edge unit that can be used in a distributed energy system.

DISCUSSION OF RELATED ART

There exists a number of site specific energy generation and back-up systems, often associated with individual commercial, residential sites, or field locations in current use or which are being developed for use. There exist several technologies that can produce electricity at a particular location. Such technologies include, for example, photovoltaic panels (e.g., solar panels); small scale natural gas turbines (also known as micro-turbines); small-scale wind turbines (in contrast to the large turbines used in grid connected wind farms); low pressure water turbines; high-pressure low flow water turbines; fuel cells using hydrogen, natural gas, and potentially other hydrocarbons; geothermal sources; energy scavenging devices; or conventional diesel, natural gas, gasoline, or other hydrocarbon generators. These technologies, used on residential, commercial, or other sites, can be referred to as "distributed energy sources." Distributed energy sources have been deployed only to a very limited extent for reasons of cost, convenience, and a lack of harmonized grid inter-connection standards. Historically, power storage and supply devices typically involve the charging of batteries that store energy in the event of a power failure of a main source of electricity at a particular site. Typically, the main source of power for a particular site is a utility power grid connected to the site (e.g. home or business), which is often designed to support the entire or selected electrical load required by a particular site. As a result, residential and commercial power storage and supply devices may be large and cumbersome. In some cases, the power storage and supply devices store the electric power produced by an alternative energy source and may even supply power to a utility power grid, in essence operating as a small, distributed power generation plant.

Such distributed power systems often provide back-up power for the established electrical grid to which it is attached and may include combinations of energy storage and energy generation. As discussed above, energy generation can include fueled generators (e.g., diesel, gasoline, natural gas, hydrogen, or generators using other fuels) as well as renewable (e.g., solar, wind, water, etc.). Storage can include battery storage from any available battery technology or other forms of mechanical storage (e.g., pumping of water to later be used in a water driven turbine). These distributed power systems may also receive and store power from the grid itself. Distributed power systems coupled to the power grid may operate with the power grid in a load shifting or load flattening mode in order to better utilize the power received from the grid.

As a result of multiple factors, including the increasing popularity of electric vehicles and the availability of an advanced metering infrastructure, the costs of implemented distributed power systems are decreasing and interests in distributed power systems is increasing. As these systems develop, there is an increasing interest in coordinating such distributed energy systems for better utilization.

Therefore, there is a need to develop better distributed energy systems.

SUMMARY

In accordance with aspects of the present invention a distributed energy system edge unit is presented. In accordance with some embodiments, an edge unit includes a power grid interface; one or more device interfaces; a processing unit coupled to the power grid interface and the one or more device interfaces, the processing unit including a communication state that allows communications with an external entity; a control and monitor state that communicates with the communication state; a check unit state that communicates with the control and monitor state and provides a unit state data; wherein the control and monitor state and the communication state provide an instruction data set, current operating parameters according to the unit state data, the instruction set data, and a characterization parameter data, and wherein the control and monitor state provides control signals to the power grid interface and the one or more device interfaces.

A method of operating a distributed energy system edge unit includes receiving an instruction set; monitoring a state of the edge unit to provide unit state data; providing current operating parameters according to the instruction set, the unit state data, and characterization parameter data; and providing control signals to a power grid interface that couples the edge unit to a power grid and one or more device interfaces that couple the edge unit to one or more devices.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
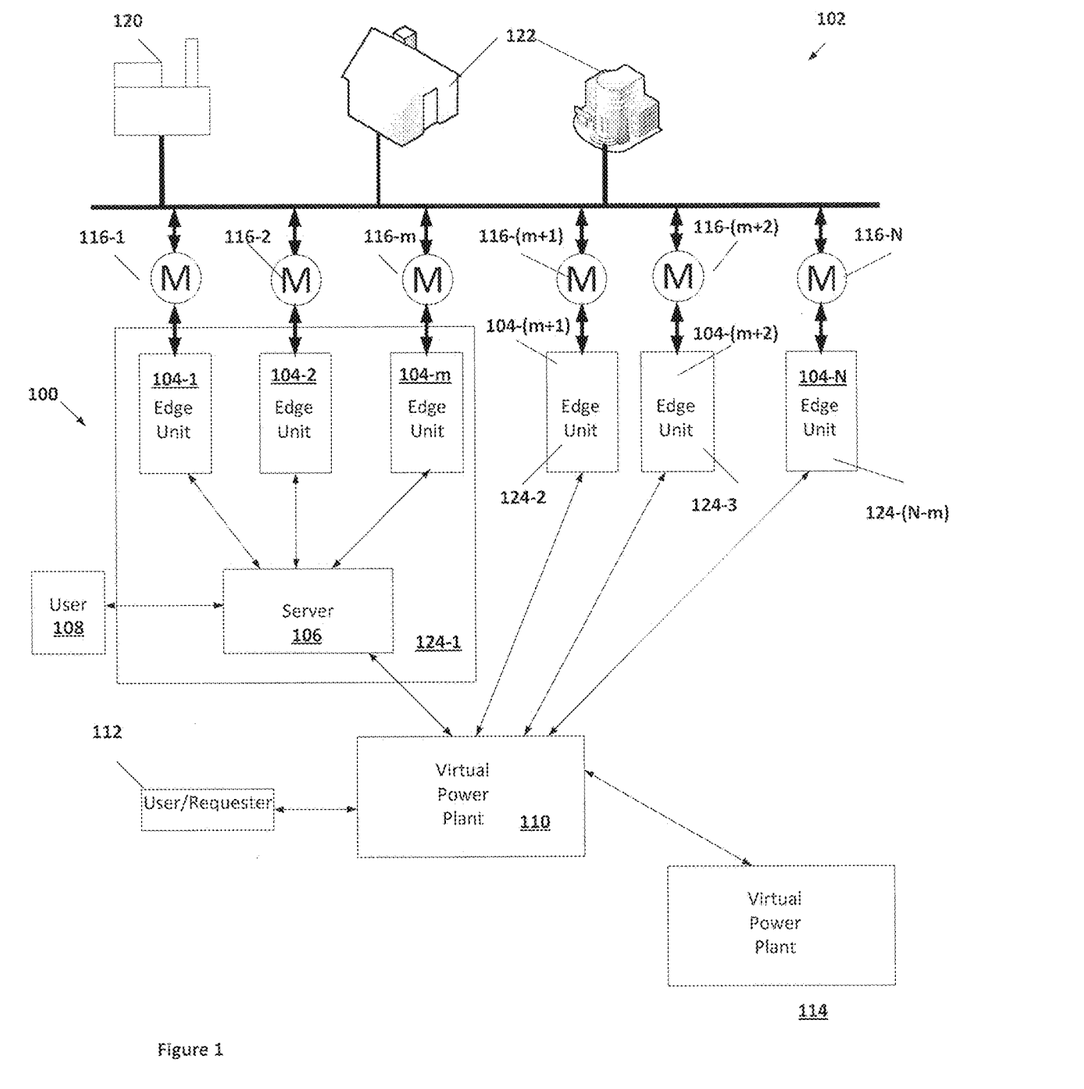
FIG. 1 illustrates an example of a system with a Virtual Power Plant (VPP) controlling a plurality of distributed power units according to some embodiments.

FIG. 1 illustrates an example power system 100 according to some embodiments. Power system 100 is an example of a group of distributed energy systems (DESs), shown as edge units 104-1 through 104-N, that are each separately coupled to a power grid 102. As such, power system 100 includes a plurality of edge units 104 (edge units 104-1 through 104-N are illustrated in FIG. 1). Edge units 104-1 through 104-N may be geographically separated and may each be associated with different residences, businesses, or other establishments.

Each of edge units 104 represents a DES that is coupled to receive and supply power to a power grid 102. In some embodiments, each of edge units 104 can be coupled to power grid 102 through a power meter 116 (power meters 116-1 through 116-N are illustrated in FIG. 1). Power meters 116 are supplied by a power company that controls grid 102 and may, for example, be smart meters. In some embodiments, power meters 116 may receive and send signals to an operator of power grid 102. In some embodiments, power meters 116 may provide signals to edge units 104 that allow control of certain aspects of edge units 104 by a power company through power meters 116.

In general, power grid 102 can be any power distribution system that receives power from power sources and provides power to power users. As shown in FIG. 1, power grid 102 receives power from power sources 120 and supplies power to power users 122. There can be any number of power sources 120 coupled to power grid 102. Power sources 120 can be, for example, commercial power plants including coil-fired plants, hydroelectric plants, geothermal plants, nuclear plants, gas-fired plants, solar production facilities, wind power facilities, individual generators or any other power production facility for the production of power. Furthermore, power system 100 may represent further power generation facilities 120 coupled to power grid 102. As illustrated in FIG. 1, power grid 102 is coupled to edge units 104, each of which may provide power to grid 102 or receive power from grid 102.

As is illustrated in FIG. 1, edge units 104 can be networked by being coupled to a server 106 or other network device such as virtual power plant 110, for example. Server 106 can provide monitor and control functions to individual ones of edge units 104. Server 106 can represent a VPP, a server, or a microgrid controller. Microgrid controllers are described in U.S. patent application Ser. No. 15/197,537, which is filed concurrently with the present application and is herein incorporated by reference in its entirety.

As illustrated in FIG. 1, edge units 104-1 through 104-$m$ are in communication with server 106. Any form of communication, including wired or wireless communications protocols, can be utilized between server 106 and edge units 104-1 through 104-$m$. As is illustrated in FIG. 1, server 106 may further communicate with a user 108 that may monitor and provide instructions to server 106. In some embodiments, server 106 may be coupled to another server. In general, a server such as server 106 can be coupled to any number of other servers and individual edge units 104.

In accordance with some embodiments, any number of edge units 104 or servers 106 may also be coupled to a virtual power plant (VPP) 110. VPP 110 provides individual instructions to individual units 124 (units 124-1 through 124-(N-m) are shown in FIG. 1. A unit 124 can be a single one of edge units 104 or may be a group that includes multiple ones of edge units 104. In particular, as shown in FIG. 1, unit 124-1 is formed by server 106 and edge units 104-1 through 104-$m$ while units 124-2 through 124-(N-m) are individual edge units 104-($m$+1) through 104-N.

As shown in FIG. 1, VPP 110 is in communication with server 106 and edge units 104-($m$+1)-104-N. Unit 124-1 is formed by server 106 and edge units 104-1 through 104-$m$ while units 124-2 through 124-(N-m) are formed by edge units 104-($m$+1) through 104-N, respectively. In general, a VPP unit 124 can include any single one of edge units 104 or any collection of edge units 104.

In general, VPP 110 receives power requests from user/requester 112 and, if that request can be satisfied by the resources represented by units 124, VPP 110 instructs units 124 in order to satisfy the power request. User/requester 112 may be, for example, a power company and may include an interface between VPP 110 and computing systems for a power company that controls power grid 102.

As is further illustrated in FIG. 1, VPP 110 may be in communication with another VPP 114. VPP 114 may provide requests to VPP 110 in order to fulfill a request that VPP 114 has received. In some embodiments, when VPP 110 receives a request from VPP 114, VPP 110 may operate similarly to server 106. A requester represents any device or user that provides a request to a VPP such as VPP 110 to store power from or provide power to a power grid 102. A VPP is further described in U.S. patent application Ser. No. 15/197,526, which is concurrently filed with this application and is herein incorporated by reference in its entirety.

Figure 2:
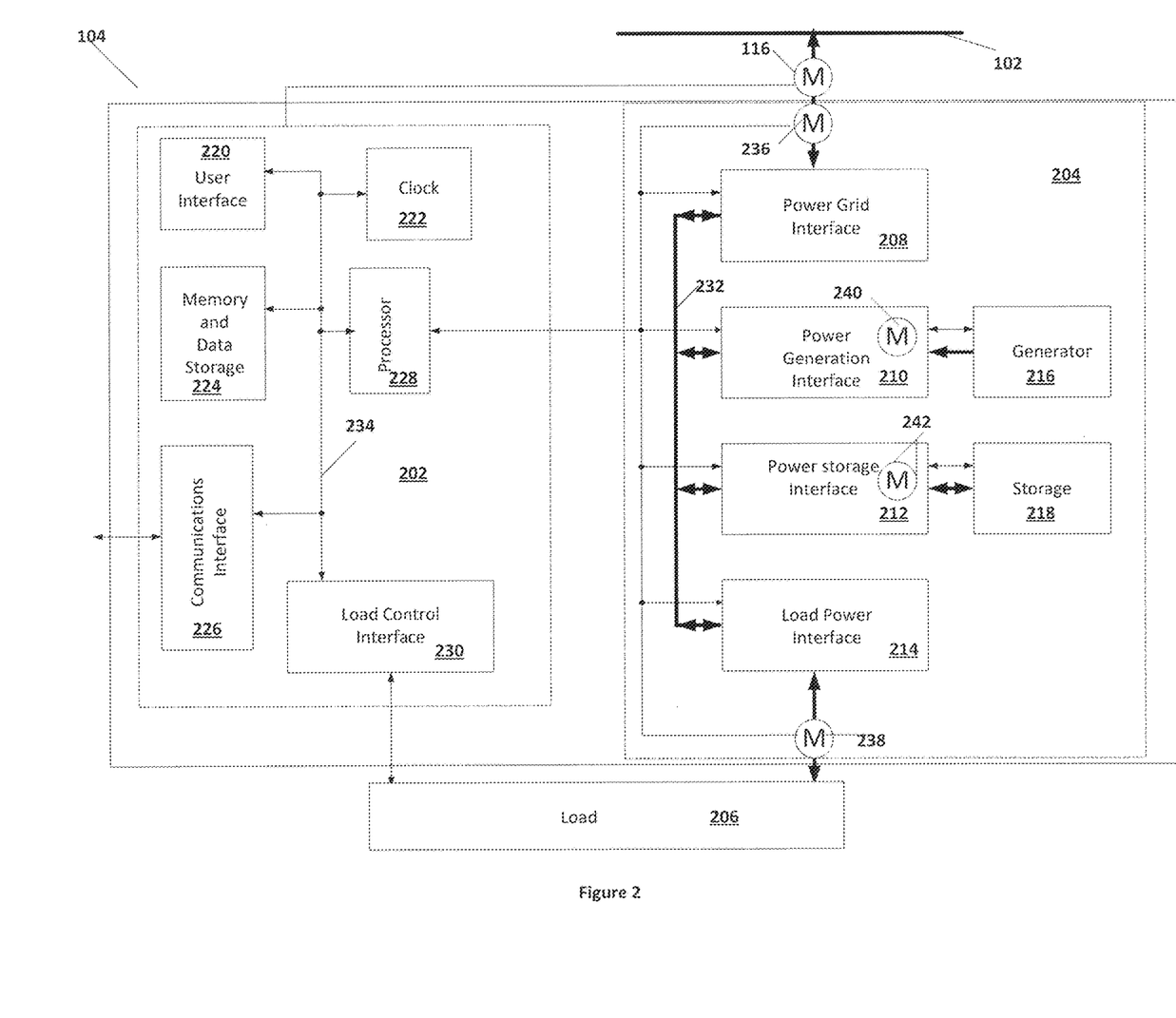
FIG. 2 illustrates an example of an edge unit as shown in FIG. 1.

FIG. 2 illustrates an example of an edge unit 104. As shown in FIG. 2, edge unit 104 includes a power distribution section 204 and a processing unit 202. Processing unit 202 controls and monitors components in power distribution section 204, as well as monitoring environmental properties such as door latches, temperature controls, humidity controls, or other components of edge unit 104. Power distribution section 204 includes interfaces for multiple power handling units. As shown in FIG. 2, power distribution unit 204 includes a power grid interface 208 and one or more of a power generation interface 210, power storage interface 212, and load power interface 214. Power distribution unit 204 can further include a power bus 232 that links each of the power grid interface 208, power generation interface 210, power storage interface 212, and load power interface 214 that are present in power distribution section 204.

Power grid interface 208 transfers power between power grid 102 and power bus 232. When edge unit 104 supplies power to grid 102, power grid interface 208 receives power from bus 232 at an internal power voltage, which is set for edge unit 104, converts the power to be compatible with grid 102, and provides the power to grid 102. In some embodiments, power bus 232 represents one or more individual power busses that each may carry different DC or AC voltages. When edge unit 104 is receiving power from power grid 102, power grid interface 208 converts power from grid 102 to be compatible with an internal voltage of bus 232 that is appropriate for the device that is receiving the power.

Power generation interface 210 interfaces between power generator 216 and power bus 232. Power generator 216 may be any source of power, for example an internal-combustion generator (diesel, gas, natural gas, hydrogen, etc.), fuel cells, solar panels, wind power, hydroelectric, or any other power source. In some embodiments, edge unit 104 may include multiple generators 216, in which case power generation interface 210 will interface any number of individual generators included in generator 216 to power bus 232. Each individual generator in generator 216 may have a dedicated and individual interface circuit in power generation interface 210.

Power storage interface 212 interfaces between an energy storage device 218 and bus 232. Storage device 218 can be any device, or combination of devices, capable of storing energy, for example batteries, mechanical storage devices (compressed air, pumped water, etc.), heat storage device, or other device designed to store energy for future retrieval. Power storage interface 212 then converts the stored energy in storage device 218 to supply power to bus 232. Power storage interface 212 further receives power from bus 232 and stores energy in storage device 218.

Load power interface 214 provides power from bus 232 to a load 206. Load 206 may, for example, be a house, business, apartment complex, telecommunications tower, hospital, or any other power user. In some embodiments, individual components of load 206 can be activated or deactivated by external signals. For example, in a house certain appliances (e.g., hot water heater, air conditioning, etc.) may be enabled or disabled to adjust the use power. Consequently, load 206 may be adjustable. In some embodiments, meter 116 provides signals to control appliances in load 206.

Interfaces 208, 210, 212, and 214 include power circuitry such as power inverters, DC-DC converters, AC-DC converters, and other electronics for power conversion between individual interfaces and between edge unit 104 and power grid 102 or load 206. Interfaces may further include metering systems to accurately monitor power flow throughout unit 104. As shown in FIG. 2, meter 236 can provide accurate measure of power between grid 102 and unit 104, specifically through power grid interface 208. Power meter 238 provides an accurate measure of power through load power interface 214 and load 206. Similarly, power generation interface 210 can include a meter 240 to monitor power flow from generator 216 and power storage interface 212 can include a meter 242 to monitor power flow between bus 232 and storage 218. Power meters 236, 238, 240, and 242 can provide signals to processing unit 202.

The depiction of power distribution section 204 illustrated in FIG. 2 is provided for discussion only. Other configurations may be provided in order to facilitate the transmission and storage of power from individual power sources or energy storage devices to power grid 102 and/or load 206. Power distribution section 204 may not include all of the components illustrated in FIG. 2. Edge unit 104 may, for example, include only storage 216 without the capability of generating power (i.e. generator 216 is absent). Edge unit 104 may, for example, not be coupled to a load 206. As such, power distribution section 204 can be characterized in terms, for example, of the amount of energy storage capability, the current level of storage available, the charge and discharge characteristics of storage 218, the amount of power generation capable, and the future ability to produce power (e.g., the amount of fuel in a generator, the current production from solar panels or wind generators, the projected production from solar panels, wind generators, and other conditionally dependent sources, or other factors that affect the ability to produce power). Additionally, each edge unit 104 can be characterized by a set of characterization parameters that describe the storage capabilities and production capabilities of the edge unit 204. Consequently, each VPP unit 124 can be characterized by a set of characterization parameters as well.

As illustrated in FIG. 2, power distribution section 204 can provide signals to and be controlled by processor unit 202. Processor unit 202 includes a processor 228. Processor 228 may be coupled through a bus 234 to memory and data storage 224 and user interface 270. Processor 228 can be any processor, microprocessor or series of processors or microprocessors that are capable of executing instructions. Memory and data storage 224 can be any collection of volatile or non-volatile memory, disk drives, read-only media, magnetic drives, or other media for storing data and instructions that can be executed by processor 228. User interface 270 may be any combination of display and user input, may be a port into which a separate device is coupled (e.g., a USB port or other such port), or may be a combination of such so that a user at edge unit 104 may provide local instructions or review the status of edge unit 104. In some embodiments, user interface 220 may also be coupled to receive signals from a smart meter such as meter 116. In some embodiments, a clock 222 may also be coupled to processor 228 through data bus 234 in order to provide accurate timing according to a standard so that all edge units 104 are operating on a uniform time. Clock 222 may, for example, provide accurate times that can be used to activate processes for the production and storage of power within power distribution 204.

Processor 228 is further coupled to a communications interface 226 for communications with other networked devices, for example a server such as server 106 or a VPP such as VPP 110. As such, communications interface 226 may be configured to communicate over a wireless or wired network and may use any communications protocol. In some embodiments, communications interface 226 may communicate with a server 106 or VPP 110 over the internet, e.g. through the cloud, through a wired, or through a wireless protocol.

Processor 228 is further coupled to a load control interface 230. Load control interface 230 may provide signals to load 206 that affect the power usage of load 206. For example, in some examples of edge unit 104, load 206 may have appliances that can be remotely activated or deactivated by signals from processor 228 through load control interface 230. The power usage of load 206 may then be controlled, or disabled completely, by processor 228. In some embodiments, processor 228 may turn appliances on and off in load 206 in order to better control the use of power within edge unit 104 and allow edge unit 104 to execute a set of instructions that it receives. Load shifting and load shaping may, for example, be accomplished in edge unit 104 by judiciously enabling or disabling appliances such as, for example, hot water heaters, car chargers, or other appliances in load 206.

As illustrated in FIG. 2, processor unit 202 is coupled to receive and provide signals to power distribution section 204. Processor unit 202 may control power distribution section 204 to route power to power grid 102, to load 206, to provide or halt generation of power from any one of the generators in generator 216, to store energy or receive energy to storage 218.

Edge unit 104 can be characterized with a set of characteristic parameters and current state parameters that are provided to other components of the network, for example VPP 110. The set of characteristic parameters can include, for example, total energy storage, generation capability, types of power generation, fuel levels for power generators, load characteristics, energy storage charging/discharging characteristics, energy storage capacity, efficiency characteristics, parasitic loss characteristics, controllability characteristics of power distribution components, characteristics of load controllability, power dispatch characteristics, power charge characteristics, among other parameters. Current state parameters can include current energy storage, current power generation, current load requirements, current power output to the grid, current loses, and other parameters.

Figure 3:
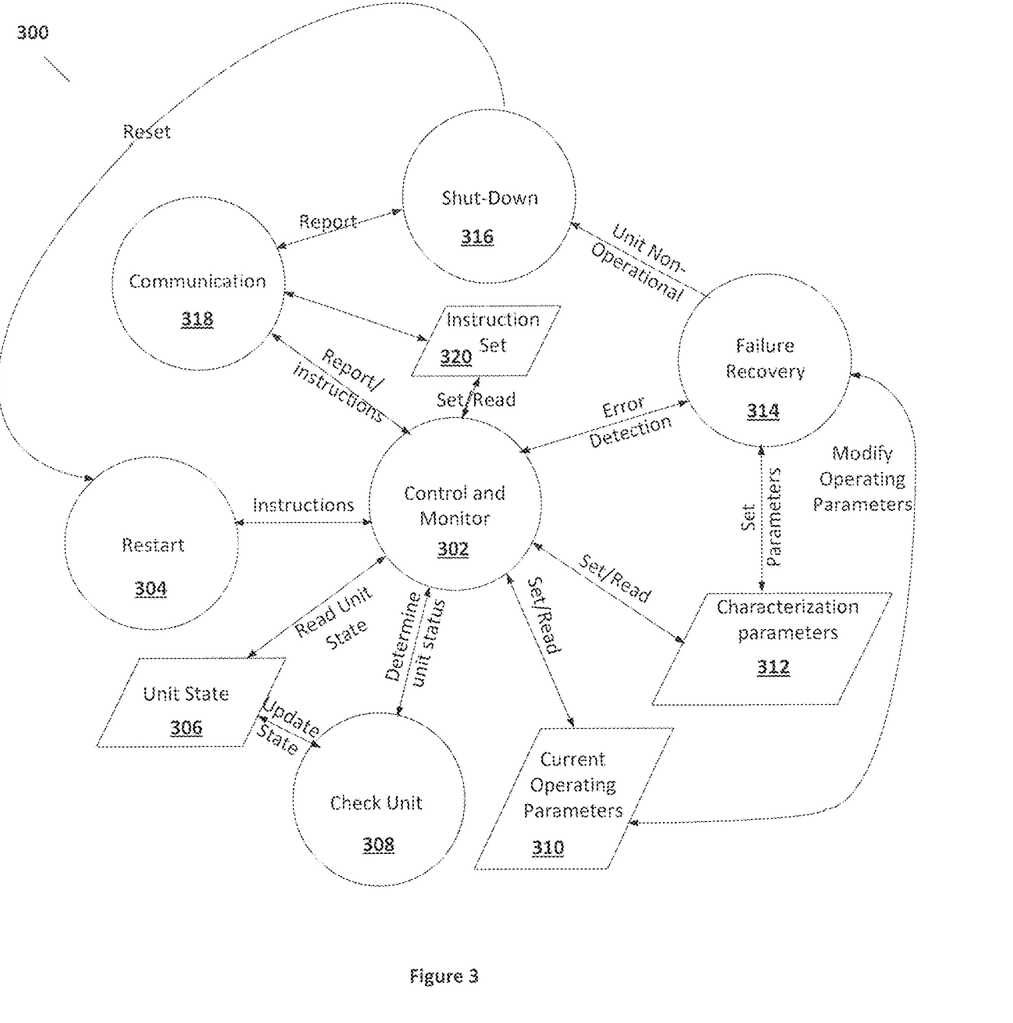
FIG. 3 illustrates operation of an edge unit as shown in FIG. 2.

FIG. 3 depicts an example state function 300 illustrating operation of processing unit 202 of an edge unit 104. The state diagram 303 illustrated in FIG. 3 illustrates various states, which can in some examples be operating simultaneously. Some or all states may continuously operate while edge unit 104 is in operation.

As shown in FIG. 3, state function 300 includes a control and monitor state 302. In control and monitor state 302, processing unit 202 uses operating parameters read from data 310 and sends signals to power distribution section 204 according to those operating parameters to control individual devices (generators, storage units, output interfaces). Operating parameters can include, for example, power generation rate, storage rate, target storage level, load levels, grid power coupling levels, or other parameters used to control operation of the components of power distribution section 204. Operating parameters may be set by control and monitor 302 from instructions received from communication 318, which are stored in instruction set data 320, and may also depend on the current unit state read from unit state data 306.

Control unit 302 can receive instructions from a server 106, VPP 110, or other sources. In some embodiments, control unit 302 can determine from multiple sets of instructions a particular set to execute and may execute the chosen set of instructions.

The instruction set stored in data 320 can include a sequential set of steps that edge unit 104 is instructed to perform. As discussed further below, instruct set data 320 may include individual instruction sets for a number of programs that may operate in control and monitor 302. The instruction set stored in data 320 can include storage target level and storage rate, generation requirements, load parameter settings, and grid coupling settings. For example, the instruction set may include instructions to perform certain operations starting at certain times and having a duration of specific times, for example to discharge a certain power level to power grid 102 starting at a specific time and ending at a specific time, or storing energy during a particular time frame, or generating power within a certain time period for storage or for supply to the grid, among other operations. Control and monitor 302 determines the operating parameters stored in current operating parameters data 310 consistently with instructions set stored in data 320 and the characterization parameters stored in characterization parameters 312.

As discussed above, characterization parameters stored in characterization parameters data 312 can include total energy storage characteristics, total power generation statistics, load characteristics (including load control parameters), grid coupling characteristics, efficiency characteristics, and parasitic loss characteristics. Some example parameter sets are illustrated in the following table I below.

TABLE I

| Characterization Parameters | Operating parameters | Current Unit State |
| --- | --- | --- |
| Total energy storage, energy storage rate characteristics, energy storage leakage characteristics. | Storage target level and storage rate. | Current energy storage, current energy storage rate. |
| Total generation capability by generation source (e.g., diesel, solar, wind, other). | Generation requirement by generation source (e.g., diesel, solar, wind, other). | Current power generation by generation source, (e.g. diesel, solar, wind, other). |
| Load Characteristics, including characteristics of load controllability | Load parameters, settable load adjustment parameters. | Current Load drain. |
| Grid coupling characteristics (power available to grid, power receipt capabilities) | Grid power settings | Current grid power |
| Efficiency Characteristics | | |
| Parasitic Loss Characteristics | | |

Efficiency Characteristics can include, for example, DC-DC loss through, for example, a solar charge controller (SCC), DC-AC loss (e.g., inverter loss), AC-DC loss (e.g., inverter loss), or other efficiency losses due to energy conversion that may occur in the system. Parasitic losses refer to losses that occur throughout the system.

As shown in FIG. 3, control and monitor 302 is coupled to read the current unit state from unit state data 306 and send signals to power generation section 204 in order to meet the operating parameters stored in current operating parameters 310. In performing that task, control and monitor 302 may rely on the characteristics of edge unit 104 to model and predict the operation of power generation section 204 in order to control particular components of power generation section 204.

In some embodiments, control and monitor 302 may transition to check unit 308, which may itself continuously operate. Check unit 308 measures the current parameters of power distribution section 204 in order to update unit state data 306. In some embodiments, check unit state 308 may continuously operate to periodically update the current state stored in unit state data 306. In some embodiments, check unit 308 may be triggered to update the data in unit state data 306 by control and monitor state 302.

Control and monitor state 302 is further coupled to transition to communications state 318 to receive instructions or to report conditions of edge unit 104. Communications state 318 includes communications through user interface 220 or through communications interface 226. Communications through user interface 220, which is co-located with edge unit 104, allows a local operator or local device (such as meter 116, for example) to alter the operation of edge unit 104 by providing instructions to processor section 202. Communications through communications interface 226 allows edge unit 104 to receive operating instructions from a VPP such as VPP 110 or from a server such as server 106.

Communications state 318 may provide instructions to control and monitor 302 when instructions are received from an external entity. The instructions may include requests to report the current state stored in unit state 306, the current operating parameters stored in operating parameters 310, or the characterization parameters stored in characterization parameters data 312. Control and Monitor state 302, upon request, sends the data for reporting to communication state 318. Further, communication state 318 may provide instructions to control and monitor state 302 to set new operating parameters in current operating parameters data 310. In such cases, control and monitor state 302 can set the requested operating parameters in current operating parameters data 310, provided they are consistent with the characterization parameters in characterization parameters data 312.

Additionally, communication state 318 may receive a set of instructions that provide multiple sets of instructions that are executed sequentially at specified times. In which case, control and monitor state 302 can reset the operating parameters of current operating parameters data 310 based on the sets of instructions stored in instruction set data 320 at the time specified by instruction set data 320.

In the event that an error in operation is detected in control and monitor state 302, then a transition to failure recover state 314 may result. Examples of errors that may occur include requiring operating parameters that exceed the characterizations of characterization parameters stored in data 312. Other examples include failure of devices, for example a power interface failure, power generation failure, storage failure, or other hardware failure in power distribution section 204. In failure recovery state 314, processor unit 202 determines whether a failure of a component of power distribution section 204 has occurred. If a failure has occurred, processor unit 202 may attempt to recover by resetting the individual component that produced the error. However, if no recovery of that component is possible, the processor unit 202 may adjust the characterization parameters stored in characterization parameters 312 to reflect the reduced capability of power distribution section 204 and return to control and monitor state 302 to continue operation of reduced capability of edge unit 104. Processor unit 202 may also adjust operating parameters to conform with the reduced capabilities reflected in the characterization parameters 312 and report the new characterization parameters out.

If the error is particularly severe, processor unit 202 may transition to a shut-down state 316. In shut-down state 316, a report is generated to communication state 318 to transmit a non-operational state to a server or VPP coupled to edge unit 104. Further, most, if not all, of components in power distribution section 204 can be turned off.

Shut-down state 316 may transition to restart 304 when an instruction to do so is received through communication 318. In some embodiments, a field technician may restart edge unit 104 from user interface 220 after repairing or replacing the component or components of power distribution section 204 that resulted in the error. In some cases, a request to restart, potentially with a reduced set of characterization parameters 312 and new set of operating parameters 310, may be received from a server or VPP through communications 318. In some embodiments, restart 304 may provide control and monitor 302 with a set of operating parameters for current operating parameters 310 which may be, for example, an idle or standby set. Once a restart is complete, control and monitor 302 may report characterization parameters stored in characterization parameters 312, operating parameters stored in current operating parameters 310, and the current state stored in unit state 306 through communications state 318.

In some embodiments, communication 318 may detect a lack of a communications link, for example to a server or a VPP. In some embodiments, when the communications link fails, edge unit 104 can continue to execute according to the instructions in instruction set data 320. In some embodiments, when the communication link fails, edge unit 104 can revert to a set of standard operating parameters and continue to function under the standard set or may transition to failure recovery 314, which may shut down edge unit 104 in shut down state 316.

Figure 4:
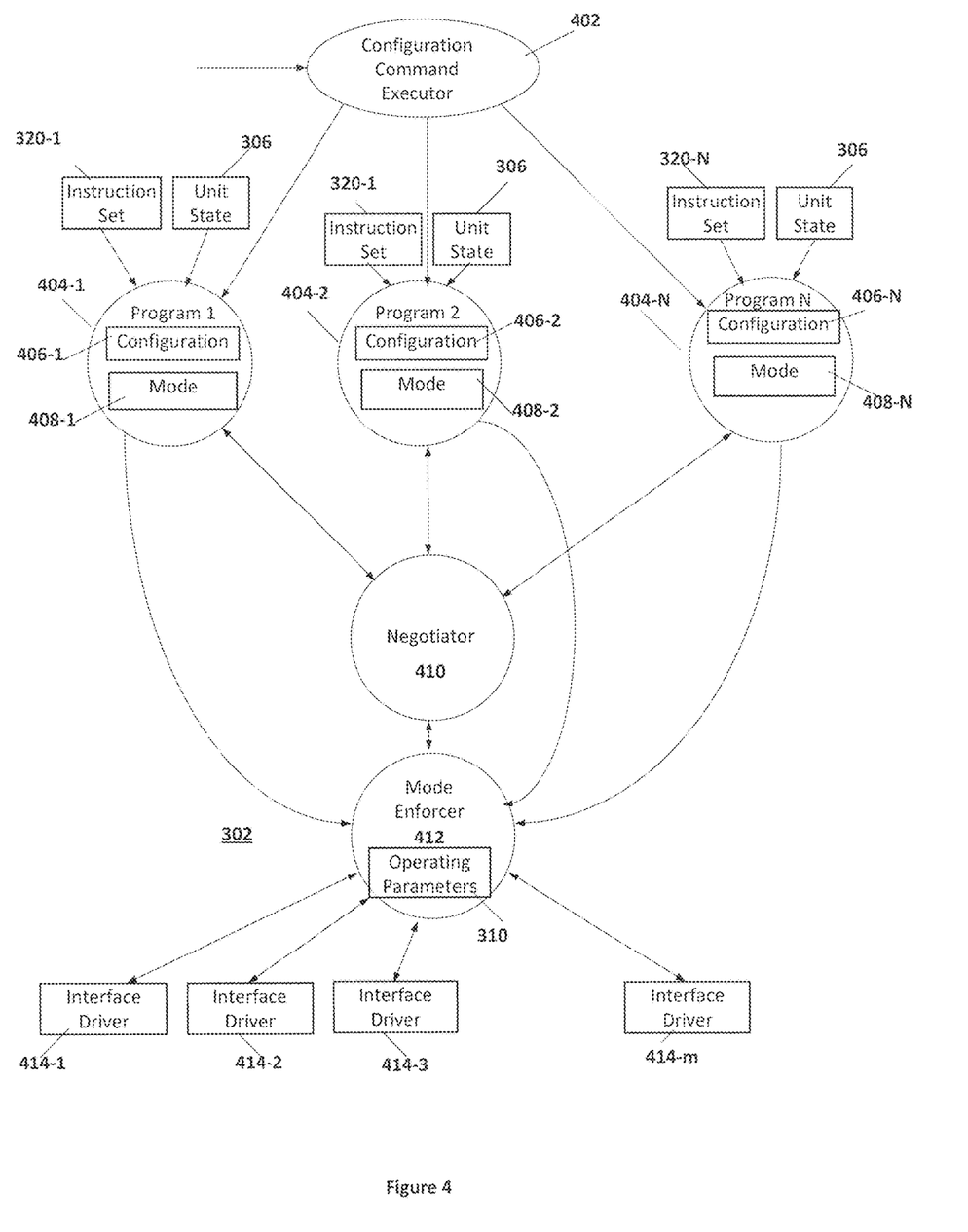
FIG. 4 illustrates further example details of operation of the edge unit illustrated in FIGS. 2 and 3.

FIG. 4 illustrates a more detailed example of aspects of control and monitor 302 according to some embodiments. As shown in FIG. 4, a configuration command executor 402 receives communications, for example from communications state 318. Configuration command executor 402 communicates with each of a plurality of programs 404-1 through 404-N. Programs 404-1 through 404-N include individual ranked programs that may be executed on processing unit 202 to control power unit 204. The plurality of programs 404-1 through 404-N may, for example, include Sequence Programs, Ruleset Programs, Override Programs, Alerts Programs, or other programs that control the operation of edge unit 102. Some examples of the programs are provided as follows:

Rule Set Program—A Rule Set Program is a general purpose rules engine based method of using environmental properties such as system states, calendar information, utility signaling, grid conditions, or other data to make decisions on parameter sets or particular modes of operation.

Sequence Programs—A sequence program is a way of creating a series of instructions to be executed sequentially in relation to a start time and duration or stop times. Sequences may, for example, be used to implement VPP instruction sets.

Override Program—An Override program designates a high priority, needs to be done now program. This type of program can be used in emergency situations where certain shutdown or other defensive procedures are implemented. In some cases, override programming can be used while testing of unit 104. In some cases, an override program can be used to execute VPP instructions. Further, individual supplier or utility operators can provide overrides through the user interface 220 or through communications with interface 226.

Timeline Program—A Timeline program allows scheduling of events in absolute time coordinates and may also be an override program.

PV Self-Consumption Programs—A PV Self-Consumption program provides for keeping as much generated power from photo-voltaic systems in the unit 104 while reducing grid demand as much as possible.

Energy Arbitrage Programs—Energy Arbitrage Programs can add extensions to PV self consumption programs to account for time of use pricing, including both shoulder and peak periods.

Power Flow Limiting Programs: Power flow limiting programs monitor available capacity, grid export limits, battery temperature, battery voltage and modifies the activities of other programs to insure battery safety, longevity, and grid regulatory requirements.

Alert Programs: Alert Programs Monitor and configure threshold alerting of all parameters in the system and generate alerts when parameters are not within allowable limits.

Client Tag Timeline Programs: A Client Tag Timeline Program can allow utilities to send a schedule of signals to the edge unit 104. The schedule of signals can turn flags on and off in edge unit 104, which may activate clusters of rules for operation of various devices within edge unit 104.

When used with a VPP 110, for example, VPP instruction sets are run with programs such as those described above.

VPP Programs generally run in the cloud or internet on VPP 110 and not in edge unit 104. Instead, VPP programming utilizes local programs such as those described above to implement the VPP program generated instruction sets. For example, override programs, sequence programs, and timeline programs can be utilized to run VPP instructions sets.

Each of the plurality of programs 404-1 through 404-N will be prioritized and have a ranking, which may change over time. Prioritization and ranking can be based on program type. For example, the ranking and prioritization may be ordered from highest to lowest priority as programs related to safety, programs related to longevity, programs associated with utility demands, programs associated with consumer interests, and default programming. For example, a sequencing program operating a VPP instruction set will generally have a high ranking whereas a ruleset program, which may be set to operate as a default set of program, may have a much lower priority. In cases where operation of edge unit 102 triggers faults or alerts, the priority of an alerts program may, for example, be increased.

In each case, configuration command executor 402 provides a configuration 406-1 through 406-N for each of programs 404-1 through 404-N, respectively. The configuration 406 includes a set of rules for each program. Each program has a different type of configuration. Further, each program 404-1 through 404-N includes modes 408-1 through 408-N, respectively. A mode refers to the actual actions to be taken by the edge unit 104. A mode may be, for example, to keep the site meter reading at 0 watts, generate and output a certain amount of power, charge the storage system to a particular charge, etc. Operating parameters may be generated to implement a particular mode.

In recognition that only one mode can be operating on edge unit 102 at any given time, a negotiator 410 determines which mode will control edge unit 102 at a given time. Each of programs 404-1 through 404-N provides a vote as to which of modes 408-1 through 408-N should executed. As discussed above, each of programs 404-1 through 404-N are prioritized so that votes from certain ones of programs 404-1 through 404-N are weighted higher in the decision than others of programs 404-1 through 404-N. Negotiator 410 determines which of modes 408-1 through 408-N is to be executed and passes that decision to mode enforcer 412.

Mode enforcer 412 operates power distribution section 204 according to the winning one of modes 408-1 through 408-N. Mode enforcer 412 generates operating parameters 310 according to the mode, the characterization parameter data 312, and the unit state data 306. Other parameters, for example grid and utility generated rules, may also be used to generate operating parameters 312.

In particular, in communication with programs 404-1 through 404-N and based on the appropriate operational parameters 310, mode enforcer 412 provides individual instructions to interfaces 208, 210, 212, and 214 through individual interface device drivers 414-1 through 414-m. Drivers 414-1 through 414-m can include any number of drivers that interface with aspects of interfaces 208, 210, 212, and 214 in order to control generators 216, storage devices 218, power to loads 206, or power to grid 102. As such, the drivers can include any interfaces, for example controlled area network (CAN) drivers, Kokam battery drivers, maximum power-point tracking (MPPT) drivers for photovoltage solar generation, MOdBuS, XAN, or other drivers that are used to interface processing unit 202 to device interfaces 208, 210, 212, and 214 of power distribution unit 204

In operation, negotiator 410 periodically queries programs 404-1 through 404-N to receive a mode vote from each of programs 404-1 through 404-N. For example, negotiator 410 may query each program on particular time intervals, for example every five (5) seconds. One skilled in the art will recognize that the time interval may be any time period. Upon each query, negotiator 410 picks amongst all of the voted on programs and selects a winning mode 408. When the winning mode 408 is picked, negotiator 410 informs mode enforcer 412. If the winning mode 408 is different from the currently executing mode, then mode enforcer 412 reconfigures and generates a new set of operating parameters 310 to execute the new mode 408. Periodically, negotiator 410 may inform mode enforcer 412 of the currently executing mode. For example, negotiator 410 may communicate with mode enforcer 412 every 200 ms (although any time period can be used). Further, mode enforcer 412 turns the requested mode into operating parameters 310, and then commands for interface drivers 414-1 through 414-m based on the operating parameters 310

The above detailed description is provided to illustrate specific embodiments of the present invention and is not intended to be limiting. Numerous variations and modifications within the scope of the present invention are possible. The present invention is set forth in the following claims.

What is claimed is:

1. A distributed energy system edge unit, comprising:
   a power distribution section, the power distribution section including
      a power grid interface that transfers power between the distributed energy system edge unit and a power grid, and
      one or more power interfaces that transfers power between the edge unit and one or more power devices;
   a processing unit coupled to the power distribution section and providing control signals to the power grid interface and the one or more power device interfaces, the processing unit including
      a processor,
      a memory coupled to the processor, and
      a communication interface coupled to the processor, the communication interface providing communications with other devices,
   the processing unit executing software according to state functions, the state functions including
      a control and monitor state, the control and monitor state coupled to characterization parameters that characterizes operation of capabilities of the power distribution section, current operating parameters that describes the current operating parameters of the power distribution section, and unit state data that describes the current operation of the power distribution section,
      a communication state coupled to the control and monitor state that allows communications of characterization parameters and current state parameters with the other devices and receives an instruction set from the other devices that includes a set that the edge unit is to perform;
      a check unit state that measures current parameters of the power distribution section to determine and provide the unit state data;
   wherein the control and monitor state sets current operating parameters according to the unit state data, the instruction set data, and the characterization parameter data to conform with the instruction set, and wherein the control and monitor state provides control signals to the power distribution section according to the current operating parameters, wherein the control and monitor state includes a configuration command executor, a plurality of programs, each of the plurality of programs receiving a configuration from the configuration command executor and each of the plurality of programs generating a mode that describes an action;

a negotiator that receives a vote provided by each of the plurality of programs identifying one of the modes for each of the plurality of programs to execute, the negotiator choosing a winning mode to execute based on the vote; and a mode enforcer receiving the winning mode from the negotiator, generating the current operating parameters based on the winning mode, and providing instructions to the power distribution section to execute the current operating parameters.

2. The edge unit of claim 1, wherein each of the plurality of programs has a priority and the negotiator considers the priority with the vote from each of the plurality of programs to choose the winning mode.

3. The edge unit of claim 2, wherein the priority is based on the type of program, with the plurality of programs be prioritized in order of safety, longevity, utility demands, consumer interests, and default programs.

4. The edge unit of claim 1, wherein the plurality of programs includes one or more of rule set programs, sequence programs, override programs, timeline programs, PV self-consumption programs, energy arbitrage programs, power flow limiting programs, alert programs, and client tag timeline programs.

5. The edge unit of claim 1, wherein the one or more power devices includes one or more power storage devices.

6. The edge unit of claim 5, wherein the one or more power storage devices includes a battery.

7. The edge unit of claim 1, wherein the one or more power devices includes one or more energy generation devices.

8. The edge unit of claim 7, wherein the one or more energy generation devices can include one or more devices from a set consisting of photo-voltaic solar generators, fuel cell generators, hydro-electric generators, and internal combustion generators.

9. A method of operating a distributed energy system edge unit, comprising:

receiving an instruction set from an external entity, the instruction set providing requested instructions for operation of the edge unit from the external entity;

monitoring a state of the edge unit to provide unit state data that describes the current operation of the power distribution section;

providing a configuration formed from current operating parameters according to the unit state data, and characterization parameter data describing capabilities of the edge unit, and the instruction set to a plurality of programs;

each of the plurality of programs generating a mode describing an action based on the configuration;

negotiating a winning mode based on a vote from each of the plurality of programs as to which of the modes to execute;

enforcing the winning mode by generating new operating parameters based on the winning mode; and providing control signals to a power distribution section that includes a power grid interface that transfers power between the edge unit to a power grid and to one or more device power interfaces that transfers power between the edge unit and one or more power devices according to the new operating parameters.

10. The method of claim 9, wherein each of the plurality of programs has a priority and negotiating the winning mode includes considering the priority of the program with the vote from each of the plurality of programs to choose the winning mode.

11. The method of claim 10, wherein the priority is based on the type of program, with the plurality of programs be prioritized in order of safety, longevity, utility demands, consumer interests, and default programs.

12. The method of claim 11, wherein the plurality of programs includes one or more of rule set programs, sequence programs, override programs, timeline programs, PV self-consumption programs, energy arbitrage programs, power flow limiting programs, alert programs, and client tag timeline programs.

13. The method of claim 9, wherein the control signals are generated by interface drivers that provide the operating signals to the power grid interface and the one or more device power interfaces.

14. The edge unit of claim 9, wherein the one or more device power interfaces includes one or more storage interfaces to one or more storage devices.

15. The edge unit of claim 14, wherein the one or more storage devices includes a battery.

16. The edge unit of claim 9, wherein the one or more device power interfaces includes one or more generator interfaces to one or more energy generation device.

17. The edge unit of claim 16, wherein the one or more energy generation device can include one or more devices from a set consisting of photo-voltaic solar generators, fuel cell generators, hydro-electric generators, and internal combustion generators.

* * * * *